United States Patent
Zhang et al.

(10) Patent No.: US 11,668,406 B2
(45) Date of Patent: Jun. 6, 2023

(54) GAS PRESSURE REGULATOR (71) Applicant: NINGBO WANAN CO., LTD., Ningbo (CN)

(72) Inventors: Feng Zhang, Ningbo (CN); Yunnan Wei, Ningbo (CN); Yanhua Wang, Ningbo (CN); Jinghui Fan, Ningbo (CN)

(73) Assignee: NINGBO WANAN CO., LTD., Ningbo (CN)

( * ) Notice: Subject to any disclaimer, the term of this patent is extended or adjusted under 35 U.S.C. 154(b) by 21 days.

(21) Appl. No.: 17/440,760

(22) PCT Filed: Sep. 25, 2020

(86) PCT No.: PCT/CN2020/117588
§ 371 (c)(1),
(2) Date: Sep. 18, 2021

(87) PCT Pub. No.: WO2021/237995
PCT Pub. Date: Dec. 2, 2021

(65) Prior Publication Data
US 2022/0316613 A1     Oct. 6, 2022

(30) Foreign Application Priority Data
May 27, 2020  (CN) .......................... 202010460338.0

(51) Int. Cl.
*F16K 17/30*     (2006.01)
(52) U.S. Cl.
CPC .................................. *F16K 17/30* (2013.01)

(58) Field of Classification Search
CPC ............ G05F 16/0402; G05F 16/0686; G05F 16/160675; F16K 17/30
See application file for complete search history.

(56) References Cited

U.S. PATENT DOCUMENTS 2,687,018 A * 8/1954 Baldwin, Jr. ...... G05D 16/0663
                                                    222/394
3,623,778 A * 11/1971 Horvath ................ B60T 8/4225
                                                    303/61

(Continued)

FOREIGN PATENT DOCUMENTS

CN         2916320 Y       6/2007
CN      205013752 U  *    2/2016

(Continued)

*Primary Examiner* — Jessica Cahill
(74) *Attorney, Agent, or Firm* — Bayramoglu Law Offices LLC (57) ABSTRACT

A gas pressure regulator includes a valve body and a valve cover. The valve cover is covered on the valve body. The valve body is provided with a valve cavity, and the valve cavity is connected to an air inlet channel and an air outlet channel. The valve cavity includes a primary pressure regulating cavity and a secondary pressure regulating cavity, and the primary pressure regulating cavity and the secondary pressure regulating cavity are communicated with each other through a valve port. The primary pressure regulating cavity is communicated with the air inlet channel, and a valve core pressure regulating assembly is disposed between the primary pressure regulating cavity and the air inlet channel. The secondary pressure regulating cavity is communicated with the air outlet channel. A lever pressure regulating assembly is disposed between the valve port and the secondary pressure regulating cavity.

8 Claims, 6 Drawing Sheets

(56) References Cited

U.S. PATENT DOCUMENTS

| | | | | |
|---|---|---|---|---|
| 4,821,767 | A | * | 4/1989 | Jackson ................ A62B 9/027 |
| | | | | 128/204.26 |
| 5,335,641 | A | * | 8/1994 | Schnabel ................ F02F 7/006 |
| | | | | 220/360 |
| 5,456,281 | A | * | 10/1995 | Teay .................. G05D 16/0683 |
| | | | | 137/505.46 |
| 9,371,925 | B2 | * | 6/2016 | Vasquez ............. G05D 16/0663 |
| 11,385,661 | B1 | * | 7/2022 | Zhang ................ G05D 16/0683 |
| 2006/0151029 | A1 | * | 7/2006 | Olds .................. G05D 16/0402 |
| | | | | 137/505 |
| 2006/0185736 | A1 | * | 8/2006 | Cavagna ............ G05D 16/0402 |
| | | | | 137/505.12 |
| 2015/0107710 | A1 | * | 4/2015 | Huang ............... G05D 16/0686 |
| | | | | 137/859 |

FOREIGN PATENT DOCUMENTS

| | | | |
|---|---|---|---|
| CN | 205139732 | U | 4/2016 |
| CN | 105910842 | A | 8/2016 |
| CN | 111623154 | A | 9/2020 |
| DE | 102018200359 | A1 | 7/2019 |
| JP | 2019124289 | A * | 7/2019 |
| JP | 2019124289 | A | 7/2019 |

* cited by examiner

GAS PRESSURE REGULATOR

CROSS REFERENCE TO THE RELATED APPLICATIONS

This application is the national phase entry of International Application No. PCT/CN2020/117588, filed on Sep. 25, 2020, which is based upon and claims priority to Chinese Patent Application No. 202010460338.0, filed on May 27, 2020, the entire contents of which are incorporated herein by reference.

TECHNICAL FIELD

The present invention relates to the technical field of valves, and more particularly, to a gas pressure regulator.

BACKGROUND

When camping outdoors, many outdoor tourists may carry a combustion furnace and a gas cylinder with fuel, and the gas in the gas cylinder is transported to the combustion furnace. The gas in the gas cylinder, however, is compressed into a liquid state in advance in order to facilitate carrying and transporting. Therefore, when the gas is output, its pressure is very high, and when it is transported to the combustion furnace, it cannot be burned normally. Thus, when the gas is output, a regulator is usually provided to reduce the gas pressure, so as to facilitate the combustion of the gas.

The gas pressure regulator in the prior art includes a valve core single-stage gas pressure regulator and a lever-type single-stage gas pressure regulator. The valve core single-stage gas pressure regulator has advantages of a simple structure, convenient manufacturing, good air tightness, and no leakage due to the rising of inlet pressure. However, during the working of the pressure regulator, when the inlet pressure decreases, the output pressure of this type of product may gradually increase, which makes it difficult to control the combustion power in actual use, and when the inlet pressure of the gas is excessively high, there exists a risk that the output gas may decrease, causing that the furnace cannot burn normally, and there exists a risk of product explosion in the furnace. The lever-type single-stage gas pressure regulator is simple in structure and convenient to manufacture. During the working of the pressure regulator, the pressure in the gas cylinder may gradually decrease as the gas volume of the gas cylinder decreases. When the inlet pressure changes, the output pressure of the product may also decrease accordingly. After the output gas of the product decreases, it cannot guarantee the furnace head of the furnace tool to perform combustion, thereby causing a risk of explosion of gas product in the furnace. In addition, since lever pad parts are directly impacted by the high pressure gas, when the product is in a closed state, the gas may very easily leak under the action of the maximum pressure of the gas cylinder, causing a potential safety hazard.

SUMMARY

The technical problem to be solved by the present invention is to provide a gas pressure regulator, and the gas pressure regulator has good air tightness, high leakage safety and stable output performance.

The present invention adopts the following technical solutions. A gas pressure regulator includes a valve body and a valve cover. The valve cover is covered on the valve body. The valve body is provided with a valve cavity, and the valve cavity is connected to an air inlet channel and an air outlet channel. The valve cavity includes a primary pressure regulating cavity and a secondary pressure regulating cavity, and the primary pressure regulating cavity and the secondary pressure regulating cavity are communicated with each other through a valve port. The primary pressure regulating cavity is communicated with the air inlet channel, and a valve core pressure regulating assembly is disposed between the primary pressure regulating cavity and the air inlet channel. The secondary pressure regulating cavity is communicated with the air outlet channel. A lever pressure regulating assembly is disposed between the valve port and the secondary pressure regulating cavity.

After adopting the above structure, the gas pressure regulator of the present invention has the following advantages in comparison with the prior art.

In the gas pressure regulator of the present invention, the valve core pressure regulating assembly is disposed between the primary pressure regulating cavity and the air inlet channel, and the lever pressure regulating assembly is disposed between the valve port and the secondary pressure regulating cavity, so that the gas pressure regulator of the present invention integrates the advantages of the valve core pressure regulating assembly and the lever pressure regulating assembly. When the inlet pressure rises or decreases, complementary effects may be generated between the two pressure regulating assemblies. Therefore, under different inlet pressures, the gas pressure regulator performs very well in safety regarding leakage and stable output performance.

As an improved solution, the valve core pressure regulating assembly includes a high pressure diaphragm. The high pressure diaphragm is disposed in the valve cavity, and the high pressure diaphragm partitions the valve cavity into the primary pressure regulating cavity and the secondary pressure regulating cavity. The valve cavity is partitioned into the primary pressure regulating cavity and the secondary pressure regulating cavity through the high pressure diaphragm, which has a simple structure and a reasonable design.

As an improved solution, an annular step is disposed in the valve body, and an edge of the high pressure diaphragm is connected on a surface of the annular step. The primary pressure regulating cavity is located in the valve body and below the high pressure diaphragm, and the secondary pressure regulating cavity is located in the valve body and above the high pressure diaphragm. A connecting channel for connecting the primary pressure regulating cavity and the secondary pressure regulating cavity is disposed at the valve body and located on a side wall of the primary pressure regulating cavity. A port of the connecting channel located at the secondary pressure regulating cavity is the valve port. After adopting this structure, it is relatively convenient to dispose the annular step and mount the high pressure diaphragm, and the sealing between the annular step and the high pressure diaphragm is better processed.

As an improved solution, the surface of the annular step is provided with an annular embedding groove, the edge of the high pressure diaphragm is provided with an embedding ring, and the embedding ring is embedded in the embedding groove. A pressing cover is fixedly connected on the surface of the annular step and located above the high pressure diaphragm, and an edge of the pressing cover is pressed on the embedding ring. After adopting this structure, the structure is simple, the assembling is convenient, and the sealing effect is better.

As an improved solution, the edge of the pressing cover is riveted and pressed on the surface of the annular step. After adopting this structure, the assembling is relatively convenient.

As an improved solution, the valve core pressure regulating assembly further includes a high pressure spring, and the high pressure spring is disposed between the pressing cover and the high pressure diaphragm. After adopting this structure, the structure is simple, and the design is relatively reasonable.

As an improved solution, a high pressure diaphragm pad is disposed on a surface of the high pressure diaphragm adjacent to the secondary pressure regulating cavity, and a middle portion of the high pressure diaphragm pad is riveted on the high pressure diaphragm through a high pressure diaphragm rivet. After adopting this structure, the high pressure diaphragm pad is disposed on the high pressure diaphragm, so as to make the structure of the high pressure diaphragm more reliable.

As an improved solution, an edge of the high pressure diaphragm pad is provided with a limiting convex ring, and a lower end of the high pressure spring is limited in the limiting convex ring. After adopting this structure, the limiting structure is relatively simple.

As an improved solution, a middle portion of the pressing cover is concave toward the high pressure diaphragm to form a boss. A groove is formed at a side of the boss away from the high pressure diaphragm. A middle portion of the boss is provided with a through hole, and the through hole is communicated with the secondary pressure regulating cavity. An upper end of the high pressure spring is sleeved outside the boss. After adopting this structure, the boss can be used to limit the high pressure spring, and the structure design is relatively reasonable.

As an improved solution, a connecting base is disposed on a side wall of the air inlet channel of the valve body and located on a lower side of the connecting channel. An air inlet base is hermetically connected on the connecting base, and a middle portion of the air inlet base is provided with an air inlet through hole communicated with the air inlet channel and the primary pressure regulating cavity. A valve core of the valve core assembly is mounted in the air inlet through hole, and an outer end of a valve core rod of the valve core abuts against the high pressure diaphragm. After adopting this structure, it is relatively convenient to disassemble and assemble the valve core.

As an improved solution, the lever pressure regulating assembly includes a lever, a lever spring and a low pressure diaphragm. The lever includes a gas blocking end and a regulating end, and a portion between the gas blocking end and the regulating end of the lever is hinged on the surface of the annular step. The gas blocking end is configured to block or open the valve port. The lever spring is supported between the regulating end of the lever and the pressing cover. An edge of the low pressure diaphragm is fixed at a joint of the valve body and the valve cover. A regulating assembly is disposed on the valve cover, and a lower end of the regulating assembly abuts against the low pressure diaphragm. After adopting this structure, the structure of the lever pressure regulating assembly is simple, and the design thereof is reasonable.

As an improved solution, a first hinged base and a second hinged base are disposed on the surface of the annular step and located on both sides of the valve port, respectively. The lever is disposed between the first hinged base and the second hinged base. The lever is connected to a lever pin, and both ends of the lever pin are hinged on the first hinged base and the second hinged base, respectively. After adopting this structure, the design is relatively reasonable.

As an improved solution, the first hinged base and the second hinged base are located on an outer side of the pressing cover, and an inclined clearance plane is disposed at a position of the pressing cover adjacent to a hinged portion of the lever. After adopting this structure, the inclined clearance plane is disposed at the pressing cover to prevent the pressing cover from interfering the lever during the movement of the lever.

In the figures: 1. valve body; 101. air inlet channel; 102. air outlet channel; 103. primary pressure regulating cavity; 104. secondary pressure regulating cavity; 105. valve port; 106. valve core; 107. high pressure diaphragm; 108. high pressure spring; 109. valve core rod; 110. annular step; 111. embedding groove; 112. embedding ring; 113. high pressure diaphragm rivet; 114. high pressure diaphragm pad; 115. connecting channel; 116. pressing cover; 117 mounting ring; 118. limiting protrusion; 119. limiting groove; 120. pressing cover cap; 121. boss; 122. groove; 123. through hole; 124. limiting concave ring; 125. protrusion; 126. first hinged base; 127. second hinged base; 128. inclined clearance plane; 129. support ring; 130. connecting base; 131. air inlet base; 132. air inlet through hole; 133. valve core; 2. valve cover; 201. convex neck; 3. lever; 301. gas blocking end; 302. regulating end; 303. limiting boss; 304. tapered protrusion; 305. plug; 4. lever spring; 5. low pressure diaphragm; 501. low pressure diaphragm pad; 502. low pressure diaphragm rivet; 6. lever pin; 7. knob; 8. sliding member; 9. threaded rod; 10. knob spring; 11. low pressure spring.

DETAILED DESCRIPTION OF THE EMBODIMENTS

In order to better understand the present invention, various aspects of the present invention are be explained in detail with reference to the drawings. It should be understood that these detailed explanations are only depictions of exemplary embodiments of the present invention and do not limit the scope of the present invention in any way. In the full text of the description, the same reference signs refer to the same elements.

In the drawings, the thickness, size and shape of the objects have been slightly exaggerated in order to facilitate explanations. The drawings are illustrative only and not strictly drawn to scale.

It should also be understood that the terms "contain", "include/comprise", "have", "involve" indicate the existence of the described features, whole, steps, operations, elements and/or components when they are used in this description, but do not exclude the existence or addition of one or more of other features, whole, steps, steps, operations, elements, components and/or combinations thereof.

As shown in FIGS. 1 to 12, the present invention provides a gas pressure regulator including the valve body 1 and the valve cover 2. The valve cover 2 is covered on the valve body 1.

Figure 11:
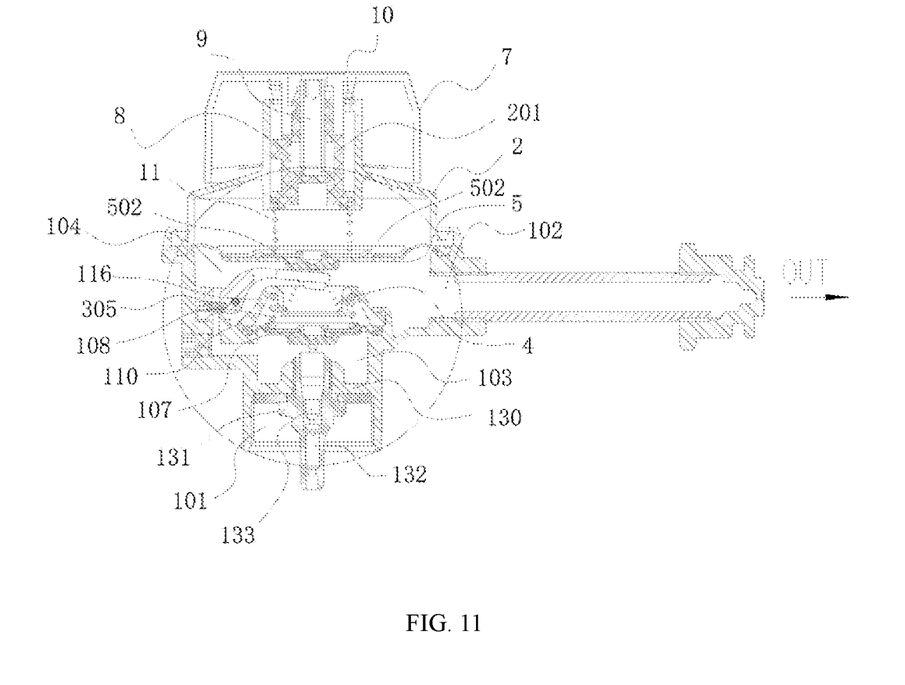
FIG. 11 is a cross-sectional view of the structure of the gas pressure regulator of the present invention.
Figure 12:
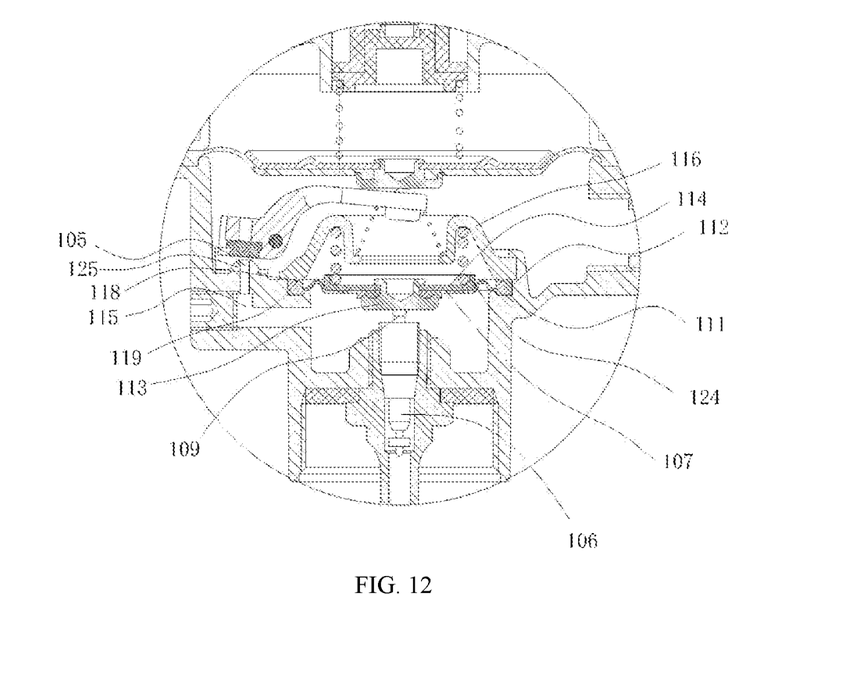
FIG. 12 is an enlarged view of the structure of FIG. 11.

As shown in FIGS. 11 to 12, the valve body 1 is provided with a valve cavity, the air inlet channel 101 and the air outlet channel 102. The air inlet channel 101 is disposed at the lower end of the valve body 1, and the air outlet channel 102 is disposed at a side portion of the valve body 1. The air inlet channel 101 and the air outlet channel 102 are both communicated with the valve cavity. The air inlet channel 101 is configured to be connected to an opening of the gas cylinder, and the air outlet channel 102 is configured to be connected to a connecting pipe.

As shown in FIGS. 11 to 12, the valve cavity includes the primary pressure regulating cavity 103 and the secondary pressure regulating cavity 104. The primary pressure regulating cavity 103 and the secondary pressure regulating cavity 104 are communicated with each other through the valve port 105. The primary pressure regulating cavity 103 is communicated with the air inlet channel 101, and a valve core pressure regulating assembly is disposed between the primary pressure regulating cavity 103 and the air inlet channel 101. The secondary pressure regulating cavity 104 is communicated with the air outlet channel 102. A lever pressure regulating assembly is disposed between the valve port 105 and the secondary pressure regulating cavity 104.

The valve core pressure regulating assembly includes the valve core 106, the high pressure diaphragm 107 and the high pressure spring 108. The valve core 106 is a prior art, and thus is not repeated here. When the pressure at the valve core rod 109 of the valve core 106 is relatively large, the valve core rod 109 is triggered to open the valve of the valve core and make it conduct. The inner wall of the valve body 1 is provided with the annular step 110. The annular step 110 is provided with the embedding groove 111, and the embedding groove 111 has an annular structure. The high pressure diaphragm 107 is circular. The edge of the high pressure diaphragm 107 is provided with the embedding ring 112, and the thickness of the embedding ring 112 is greater than the thickness of the high pressure diaphragm 107. The edge of the high pressure diaphragm 107 is connected at the middle position of the side wall of the embedding ring 112. The shape and size of the embedding ring 112 are matched with the shape and size of the embedding groove 111, and the embedding ring 112 is embedded in the embedding groove 111. The middle portion of the high pressure diaphragm 107 is riveted with the high pressure diaphragm pad 114 through the high pressure diaphragm rivet 113, and the high pressure diaphragm pad 114 is located on the upper side of the high pressure diaphragm 107. The high pressure diaphragm 107 partitions the valve cavity into the primary pressure regulating cavity 103 and the second pressure regulating cavity 104. Specifically, the primary pressure regulating cavity 103 is below the high pressure diaphragm 107, and the secondary pressure regulating cavity 104 is above the high pressure diaphragm 107. The side wall of the valve body 1 is provided with the connecting channel 115. One port of the connecting channel 115 is communicated with the primary pressure regulating cavity 103, and the other port of the connecting channel 115 is communicated with the secondary pressure regulating cavity 104. The other port of the connecting channel 115 is the valve port 105 disposed on the surface of the annular step.

Figure 1:
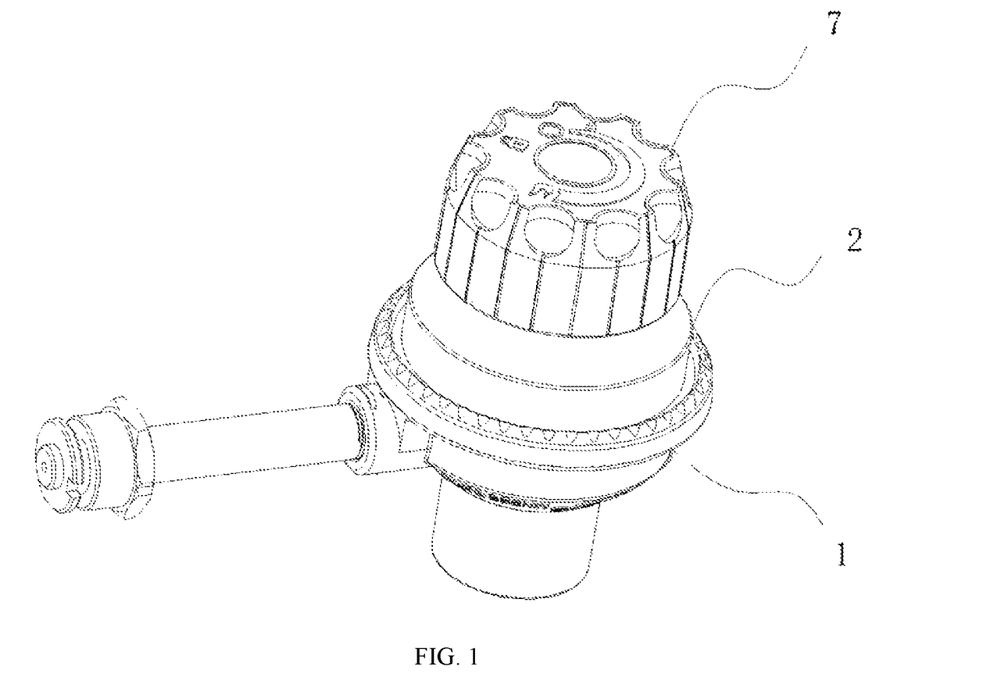
FIG. 1 is a perspective view of the structure of a gas pressure regulator of the present invention.
Figure 2:
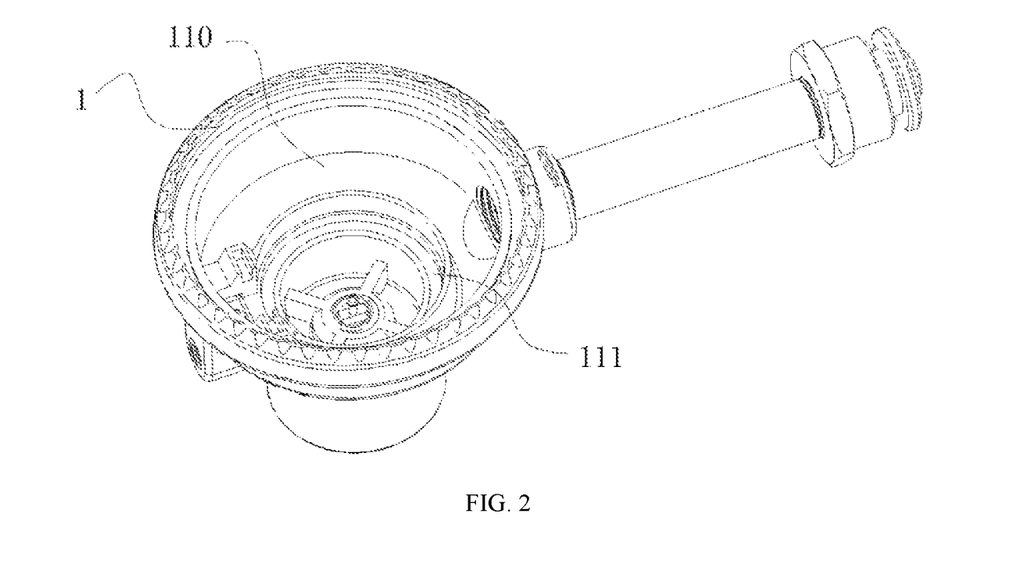
FIG. 2 is a perspective view of the structure of a valve body according to the gas pressure regulator of the present invention.
Figure 3:
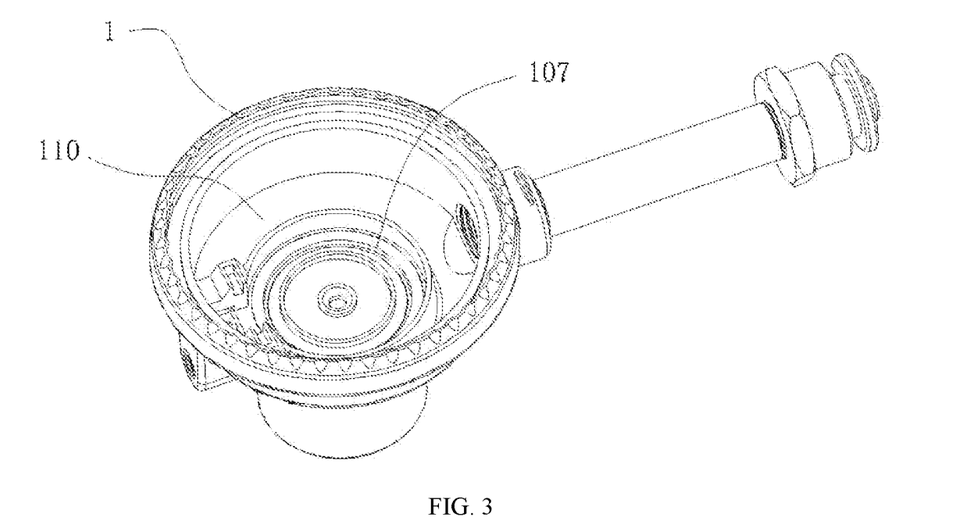
FIG. 3 is a perspective view of the structure obtained after the valve body is assembled with a high pressure diaphragm according to the gas pressure regulator of the present invention.
Figure 4:
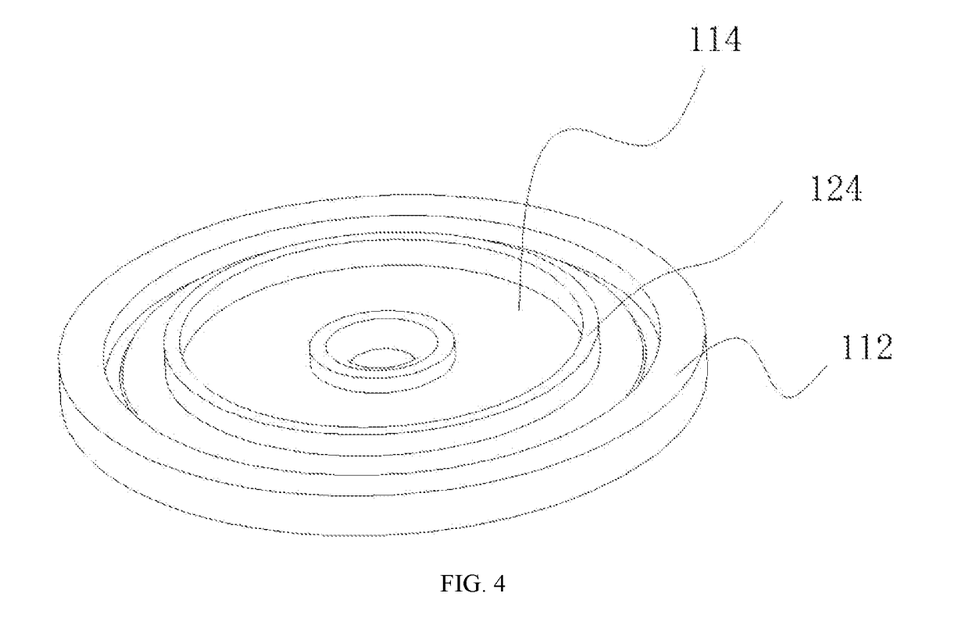
FIG. 4 is a perspective view of the structure of the high pressure diaphragm according to the gas pressure regulator of the present invention.
Figure 5:
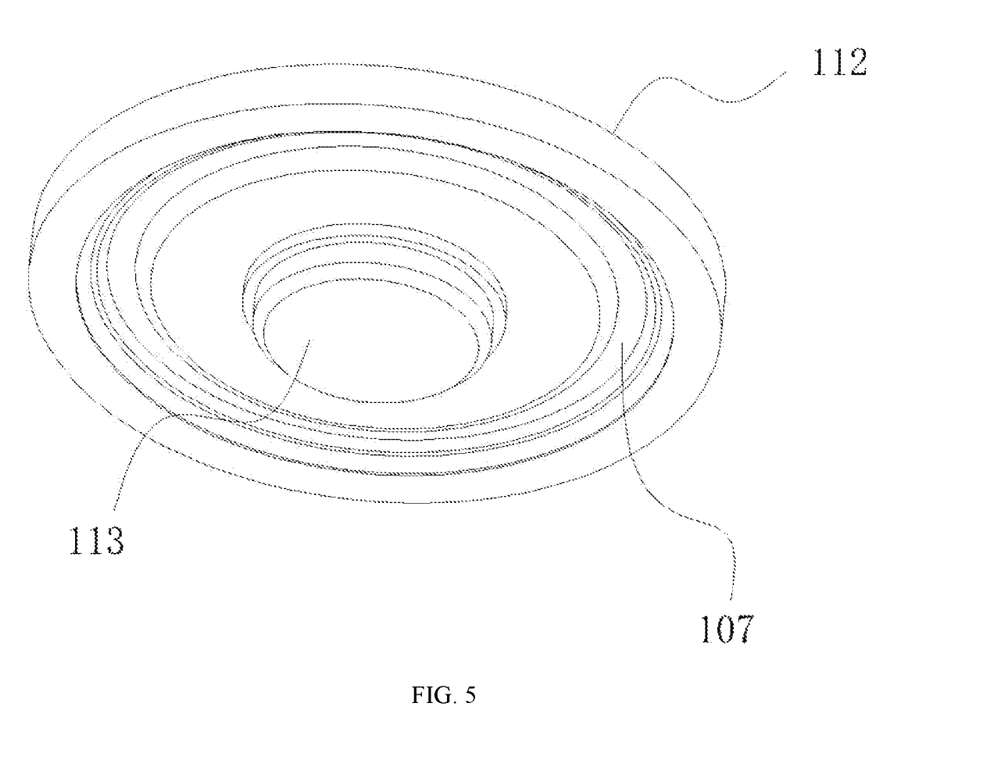
FIG. 5 is another perspective view of the structure of the high pressure diaphragm according to the gas pressure regulator of the present invention.
Figure 6:
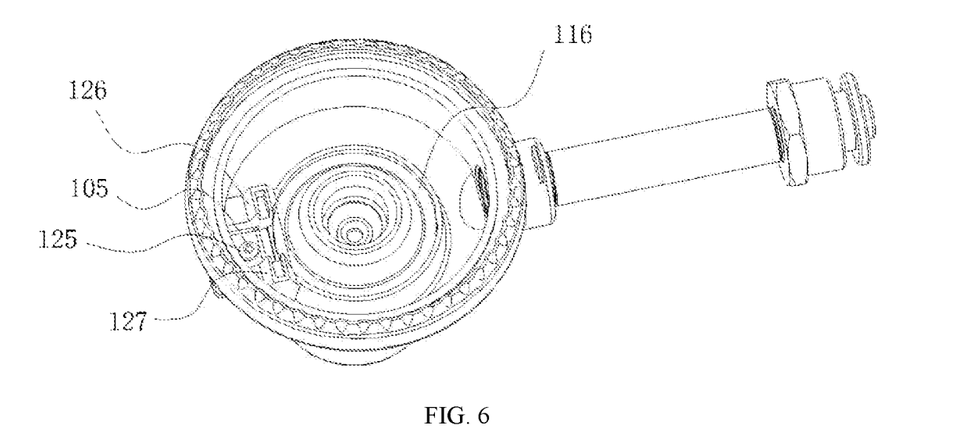
FIG. 6 is a perspective view of the structure of a part of the gas pressure regulator of the present invention.
Figure 7:
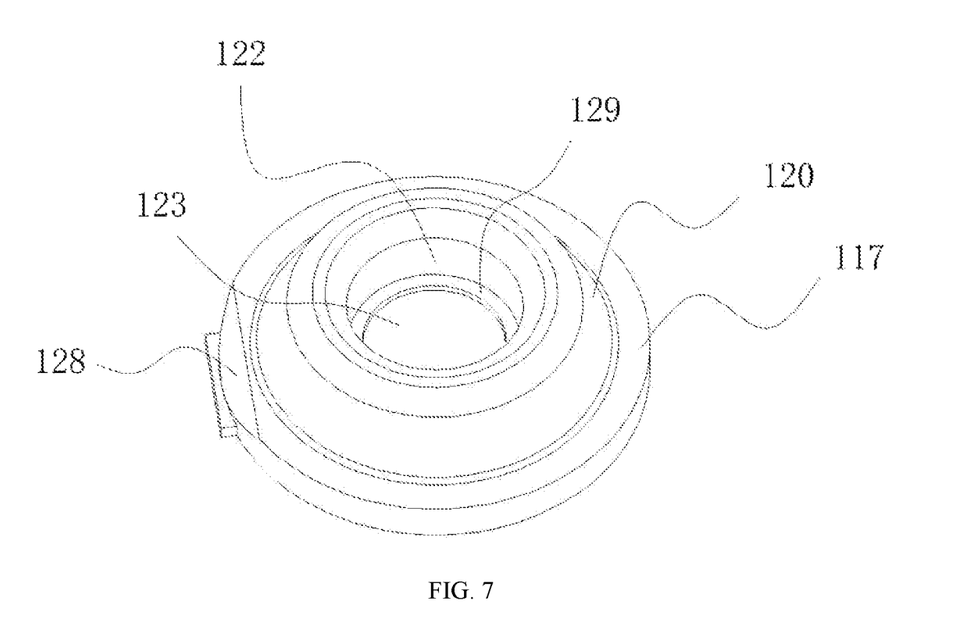
FIG. 7 is a perspective view of the structure of a pressing cover according to the gas pressure regulator of the present invention.
Figure 8:
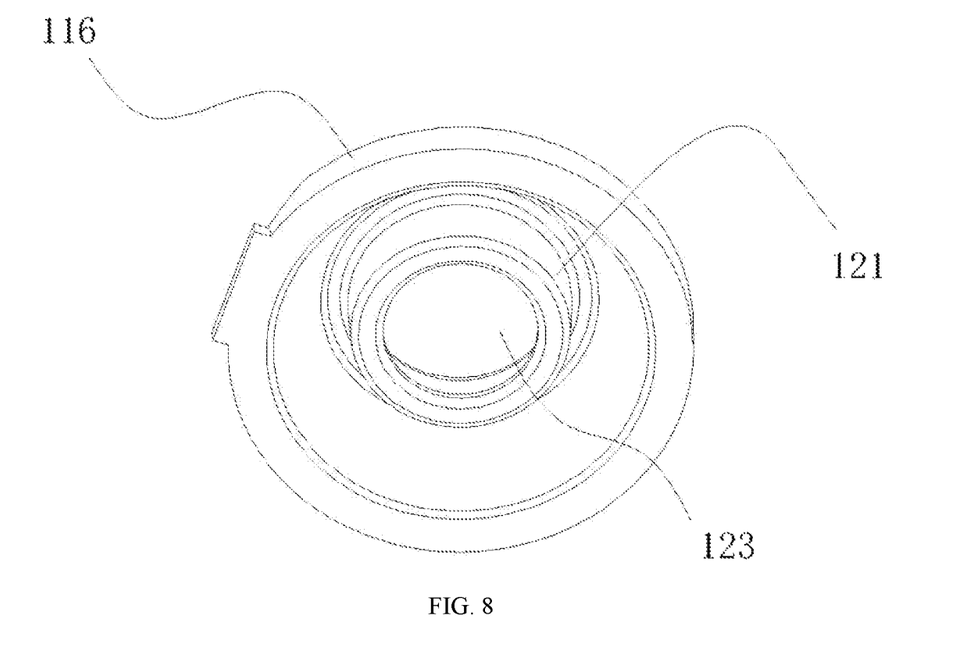
FIG. 8 is another perspective view of the structure of the pressing cover according to the gas pressure regulator of the present invention.
Figure 9:
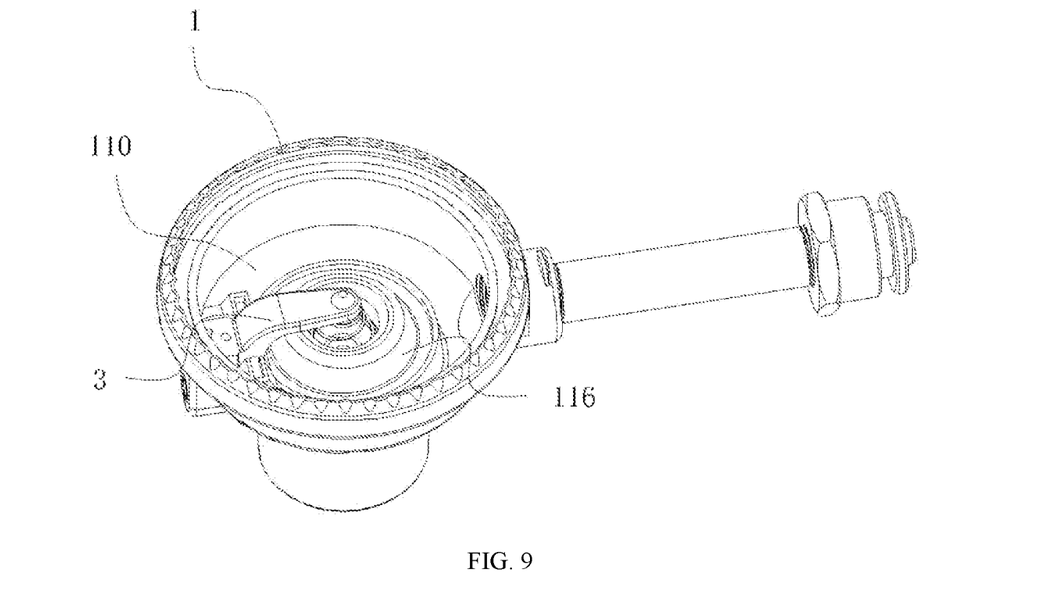
FIG. 9 is a perspective view of the structure of a part of the gas pressure regulator of the present invention.

As shown in FIGS. 7 to 8, the pressing cover 116 is mounted on the surface of the annular step. The edge of the pressing cover 116 is pressed on the embedding ring 112 of the high pressure diaphragm 107, and the edge of the pressing cover 116 is fixedly riveted on the surface of the annular step. The edge of the pressing cover 116 is relatively thick to form the mounting ring 117, and the lower surface of the mounting ring 117 is a plane. The lower plane of the mounting ring 117 is provided with the limiting protrusion 118, and the upper plane of the embedding ring of the high pressure diaphragm 107 is provided with the limiting groove 119. The limiting protrusion 118 is embedded in the limiting groove 119. The inner side of the mounting ring 117 is provided with the pressing cover cap 120 which is convex upward and hollow, and the middle portion of the pressing cover cap 120 is concave downward to form the boss 121. The groove 122 is formed on the side of the boss 121 away from the high pressure diaphragm 107. The middle portion of the boss 121 is provided with the through hole 123, and the through hole 123 is communicated with the secondary pressure regulating cavity 104. The high pressure spring 108 is disposed between the pressing cover 116 and the high pressure diaphragm pad 114. The edge of the high pressure diaphragm pad 114 is provided with the limiting convex ring 124, and the lower end of the high pressure spring 108 is limited in the inner side of the limiting convex ring 124, so as to prevent the lower end of the high pressure spring 108 from falling out during use. The upper end of the high pressure spring 108 is sleeved outside the boss 121, so as to prevent the upper end of the high pressure spring 108 from falling out during use.

Figure 10:
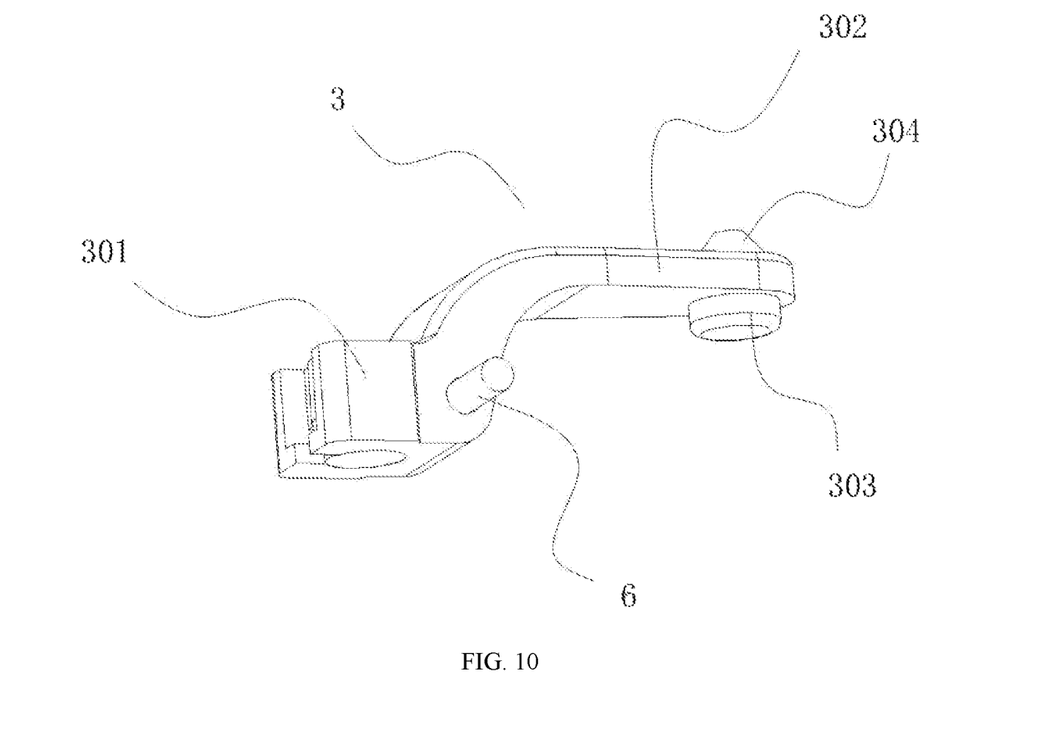
FIG. 10 is a perspective view of the structure of a lever according to the gas pressure regulator of the present invention.

As shown in FIG. 10, the lever pressure regulating assembly includes the lever 3, the lever spring 4 and the low pressure diaphragm 5. The lever 3 includes the gas blocking end 301 and the regulating end 302. The protrusion 125 is disposed on the surface of the annular step and located on the outer side of the pressing cover 116, and the middle portion of the protrusion 125 is hollow to form the valve port 105. The first hinged base 126 and the second hinged base 127 are disposed on the surface of the annular step and located on both sides of the protrusion 125, respectively. The first hinged base 126 and the second hinged base 127 are both located on the outer side of the pressing cover 116 and disposed symmetrically to each other. A portion between the gas blocking end 301 and the regulating end 302 of the lever 3 is hinged on the first hinged base 126 and the second hinged base 127 through the lever pin 6, so that the lever 3 can swing back and forth by taking the lever pin 6 as a fulcrum. The portion of the mounting ring 117 of the pressing cover 116 located between the first hinged base 126 and the second hinged base 127 is provided with the inclined clearance plane 128 to avoid interfering the lever 3 when the lever 3 swings. A plug (not shown) is disposed on the side of the gas blocking end 301 of the lever 3 adjacent to the valve port 105, and the plug is configured to block the valve port 105. The lever spring 4 is disposed between the pressing cover 116 and the regulating end 302 of the lever 3. The bottom of the groove 122 of the pressing cover 116 is provided with the support ring 129, and the middle portion of the support ring 129 is the through hole 123. The lower end of the lever spring 4 is mounted on the support ring 129, and the side wall of the groove 122 limits the position of the lever spring 4. The limiting boss 303 is disposed on the lower surface of the regulating end 302 of the lever 3 adjacent to the pressing cover 116, and the upper end of the lever spring 4 is sleeved outside the limiting boss 303.

The low pressure diaphragm 5 is disposed between the valve body 1 and the valve cover 2, and the low pressure diaphragm 5 is pressed and mounted on a joint of the valve body 1 and the valve cover 2. The upper side of the low pressure diaphragm 5 is provided with the low pressure diaphragm pad 501, and the low pressure diaphragm pad 501 is riveted on the low pressure diaphragm 5 through the low pressure diaphragm rivet 502. The upper end of the valve cover 2 is provided with the hollow convex neck 201, and the upper end of the convex neck 201 is provided with a knob 7 that is axially limited and can circumferentially rotate. The sliding member 8 is slidably fitted in the convex neck 201. The sliding member 8 can slide along the length direction of the convex neck 201, and the convex neck 201 circumferentially limits the position of the sliding member. The upper end surface of the sliding member 8 is provided with a threaded hole, the inner wall of the knob 7 is provided with a threaded rod, and the threaded rod is fitted in the threaded hole. The knob spring 10 is disposed between the inner wall of the knob 7 and the upper end of the convex neck 201. The low pressure spring 11 is disposed between the lower end of the sliding member 8 and the low pressure diaphragm pad 501. The tapered protrusion 304 is disposed on the upper surface of the regulating end 302 of the lever 3 adjacent to the low pressure diaphragm 5, and the tapered protrusion 304 abuts against the middle portion of the low pressure diaphragm rivet 502.

The connecting base 130 is disposed on the side wall of the air inlet channel 101 of the valve body 1 and located on the lower side of the connecting channel 115. The air inlet base 131 is hermetically connected on the connecting base 130. The middle portion of the air inlet base 131 is provided with the air inlet through hole 132 communicated with the air inlet channel 101 and the primary pressure regulating cavity 103. The valve core 133 is mounted in the air inlet through hole 132, and the outer end of the valve core rod 109 of the valve core 133 abuts against the middle portion of the high pressure diaphragm rivet 113 of the high pressure diaphragm 107.

During the assembly of the gas pressure regulator of the present invention, the lower end of the valve body is connected to an outlet of a small gas cylinder, so that the air inlet channel of the valve body is communicated with the inner cavity of the small gas cylinder, and the pressure in the air inlet channel is identical to the pressure in the small gas cylinder. The working process of the gas pressure regulator of the present invention is as follows.

When the gas pressure regulator is connected to the outlet of a small gas cylinder, the gas is input to the pressure regulator with the pressure of 25-201 pounds per square inch (PSI) (the more sufficient the gas in the cylinder, the higher the pressure). The gas first passes through a pressure reducing structure of a primary valve core of the pressure regulator. After a certain amount of gas passes through the valve core, the pressure in the area below the high pressure diaphragm is increased, so that the high pressure diaphragm overcomes the high pressure spring to move upward. The high pressure diaphragm moves upward to enable the rivet abutting against the valve core to be separated from the valve core (the valve core is closed), so that the pressure does not continue to be increased. Only after the gas is output to decrease the pressure in the area below the high pressure diaphragm, the high pressure diaphragm moves downward under the action of the high pressure spring, so that the valve core is turned on to allow the gas to pass, so as to supplement the pressure. Such a high frequency cycle utilizes back-pressure characteristics of the valve core simultaneously (the pressure after the primary pressure reduction increases as the pressure of the gas cylinder decreases), so that the pressure in a primary pressure reduction area below the high pressure diaphragm is always kept within a controllable pressure range of 10-15 PSI.

The pressure fluctuation range of the gas after the primary pressure reduction is still relatively large, and thus cannot satisfy the requirement of precisely controlling the output of the gas. In this solution, the gas after the primary pressure reduction passes through a secondary pressure reducing structure of the lever, so as to realize a precise pressure reduction. After a certain amount of gas passes through the valve port of the lever, the pressure below the low pressure diaphragm is increased, so that the low pressure diaphragm overcomes the low pressure spring to move upward. The low pressure diaphragm moves upward to enable the rivet abutting against a tail end of the lever to be separated. Meanwhile, the tail end of the lever closes the valve port under the action of the lever spring below the lever, so that the pressure in a secondary pressure reduction area does not continue to be increased. Only after the gas is output to decrease the pressure in the area below the low pressure diaphragm, the low pressure diaphragm moves downward under the action of the low pressure spring above the low pressure diaphragm to overcome the lever spring, so that the valve port is opened to allow the gas to pass, so as to supplement the pressure. The high frequency cycle utilizes positive pressure characteristic of the lever simultaneously (the pressure is reduced steadily as the input pressure decreases). In this way, the pressure of the gas cylinder of 25-201 PSI is precisely regulated to achieve the final gas output requirement of 5±3 kPa.

What is claimed is:
1. A gas pressure regulator, comprising a valve body and a valve cover, wherein
the valve cover is covered on the valve body;
the valve body is provided with a valve cavity, and the valve cavity is connected to an air inlet channel and an air outlet channel;
the valve cavity comprises a primary pressure regulating cavity and a secondary pressure regulating cavity, wherein the primary pressure regulating cavity and the secondary pressure regulating cavity are communicated with each other through a valve port;
the primary pressure regulating cavity is communicated with the air inlet channel, and a valve core pressure regulating assembly is disposed between the primary pressure regulating cavity and the air inlet channel;

the secondary pressure regulating cavity is communicated with the air outlet channel; and a lever pressure regulating assembly is disposed between the valve port and the secondary pressure regulating cavity;

the valve core pressure regulating assembly comprises a high pressure diaphragm;

the high pressure diaphragm is disposed in the valve cavity;

the high pressure diaphragm partitions the valve cavity into the primary pressure regulating cavity and the secondary pressure regulating cavity;

an annular step is disposed in the valve body, and an edge of the high pressure diaphragm is connected on a surface of the annular step;

the primary pressure regulating cavity is located in the valve body, and the primary pressure regulating cavity is located below the high pressure diaphragm;

the secondary pressure regulating cavity is located in the valve body, and the secondary pressure regulating cavity is located above the high pressure diaphragm;

a connecting channel for connecting the primary pressure regulating cavity and the secondary pressure regulating cavity is disposed at the valve body, and the connecting channel is located on a side wall of the primary pressure regulating cavity;

a port of the connecting channel is the valve port, wherein the port of the connecting channel is located at the secondary pressure regulating cavity;

the surface of the annular step is provided with an annular embedding groove;

the edge of the high pressure diaphragm is provided with an embedding ring;

the embedding ring is embedded in the embedding groove;

a pressing cover is fixedly connected on the surface of the annular step, and the pressing cover is located above the high pressure diaphragm;

an edge of the pressing cover is pressed on the embedding ring;

the valve core pressure regulating assembly further comprises a high pressure spring, and the high pressure spring is disposed between the pressing cover and the high pressure diaphragm;

a middle portion of the pressing cover is concave toward the high pressure diaphragm to form a boss;

a groove is formed at a side of the boss, wherein the side of the boss is away from the high pressure diaphragm;

a middle portion of the boss is provided with a through hole, and the through hole is communicated with the secondary pressure regulating cavity; and an upper end of the high pressure spring is sleeved outside the boss.

2. The gas pressure regulator of claim 1, wherein the edge of the pressing cover is riveted and pressed on the surface of the annular step.

3. The gas pressure regulator of claim 1, wherein a high pressure diaphragm pad is disposed on a surface of the high pressure diaphragm, wherein the surface of the high pressure diaphragm is adjacent to the secondary pressure regulating cavity; and a middle portion of the high pressure diaphragm pad is riveted on the high pressure diaphragm through a high pressure diaphragm rivet.

4. The gas pressure regulator of claim 3, wherein an edge of the high pressure diaphragm pad is provided with a limiting convex ring, and a lower end of the high pressure spring is limited in the limiting convex ring.

5. The gas pressure regulator of claim 1, wherein a connecting base is disposed on a side wall of the air inlet channel of the valve body, and the connecting base is located on a lower side of the connecting channel;

an air inlet base is hermetically connected on the connecting base;

a middle portion of the air inlet base is provided with an air inlet through hole, wherein the air inlet through hole is communicated with the air inlet channel and the primary pressure regulating cavity;

a valve core of the valve core assembly is mounted in the air inlet through hole; and an outer end of a valve core rod of the valve core abuts against the high pressure diaphragm.

6. A gas pressure regulator, comprising a valve body and a valve cover, wherein the valve cover is covered on the valve body;

the valve body is provided with a valve cavity, and the valve cavity is connected to an air inlet channel and an air outlet channel;

the valve cavity comprises a primary pressure regulating cavity and a secondary pressure regulating cavity, wherein the primary pressure regulating cavity and the secondary pressure regulating cavity are communicated with each other through a valve port;

the primary pressure regulating cavity is communicated with the air inlet channel, and a valve core pressure regulating assembly is disposed between the primary pressure regulating cavity and the air inlet channel;

the secondary pressure regulating cavity is communicated with the air outlet channel;

a lever pressure regulating assembly is disposed between the valve port and the secondary pressure regulating cavity;

the valve core pressure regulating assembly comprises a high pressure diaphragm;

the high pressure diaphragm is disposed in the valve cavity;

the high pressure diaphragm partitions the valve cavity into the primary pressure regulating cavity and the secondary pressure regulating cavity;

an annular step is disposed in the valve body, and an edge of the high pressure diaphragm is connected on a surface of the annular step;

the primary pressure regulating cavity is located in the valve body, and the primary pressure regulating cavity is located below the high pressure diaphragm;

the secondary pressure regulating cavity is located in the valve body, and the secondary pressure regulating cavity is located above the high pressure diaphragm;

a connecting channel for connecting the primary pressure regulating cavity and the secondary pressure regulating cavity is disposed at the valve body, and the connecting channel is located on a side wall of the primary pressure regulating cavity;

a port of the connecting channel is the valve port, wherein the port of the connecting channel is located at the secondary pressure regulating cavity;

the surface of the annular step is provided with an annular embedding groove;

the edge of the high pressure diaphragm is provided with an embedding ring;

the embedding ring is embedded in the embedding groove;

a pressing cover is fixedly connected on the surface of the annular step, and the pressing cover is located above the high pressure diaphragm;

an edge of the pressing cover is pressed on the embedding ring;

the lever pressure regulating assembly comprises a lever, a lever spring and a low pressure diaphragm;

the lever comprises a gas blocking end and a regulating end, wherein a portion between the gas blocking end and the regulating end of the lever is hinged on the surface of the annular step;

the gas blocking end is configured to block or open the valve port;

the lever spring is supported between the regulating end of the lever and the pressing cover;

an edge of the low pressure diaphragm is fixed at a joint of the valve body and the valve cover; and a regulating assembly is disposed on the valve cover, and a lower end of the regulating assembly abuts against the low pressure diaphragm.

7. The gas pressure regulator of claim 6, wherein a first hinged base and a second hinged base are disposed on the surface of the annular step, and the first hinged base and the second hinged base are located on both sides of the valve port, respectively;

the lever is disposed between the first hinged base and the second hinged base;

the lever is connected to a lever pin; and both ends of the lever pin are hinged on the first hinged base and the second hinged base, respectively.

8. The gas pressure regulator of claim 7, wherein the first hinged base and the second hinged base are located on an outer side of the pressing cover; and an inclined clearance plane is disposed at a position of the pressing cover, wherein the position of the pressing cover is adjacent to a hinged portion of the lever.

\* \* \* \* \*